US012762347B2

(12) United States Patent
Muralidharan et al.

(10) Patent No.: US 12,762,347 B2
(45) **Date of Patent: *Oct. 13, 2026**

(54) MACHINE LEARNING TECHNIQUES FOR SEMANTIC PROCESSING OF STRUCTURED NATURAL LANGUAGE DOCUMENTS TO DETECT ACTION ITEMS

(71) Applicants: ATLASSIAN PTY LTD., Sydney (AU); ATLASSIAN US, INC., San Francisco, CA (US)

(72) Inventors: Karthik Muralidharan, Bangalore (IN); Krishna Sai, Bangalore (IN); Sri Vardhamanan A, Chennai (IN); Bailur Arjun Kini, Bangalore (IN); Shashank Prasad Rao, Bengaluru (IN)

(73) Assignees: Atlassian Pty, Ltd., AÙ San Francisco (CA); Atlassian US, Inc., San Francisco, CA (US)

(*) Notice: Subject to any disclaimer, the term of this patent is extended or adjusted under 35 U.S.C. 154(b) by 110 days.

This patent is subject to a terminal disclaimer.

(21) Appl. No.: 18/656,655

(22) Filed: May 7, 2024

(65) Prior Publication Data

US 2024/0370655 A1 Nov. 7, 2024

Related U.S. Application Data

(63) Continuation of application No. 17/385,563, filed on Jul. 26, 2021, now Pat. No. 12,008,322.

(51) Int. Cl.
*G06F 40/20* (2020.01)
*G06F 40/205* (2020.01)
*G06F 40/30* (2020.01)
*G06N 20/00* (2019.01)

(52) U.S. Cl.
CPC ............ *G06F 40/30* (2020.01); *G06F 40/205* (2020.01); *G06N 20/00* (2019.01)

(58) Field of Classification Search
CPC .......... G06F 40/20; G06F 40/30; G06F 40/35; G06N 20/00
See application file for complete search history.

(56) References Cited

U.S. PATENT DOCUMENTS 10,706,373 B2 * 7/2020 Gruber ............. G06Q 10/06311
11,997,138 B1 * 5/2024 Alyahya ............. H04L 63/1483
12,380,344 B2 * 8/2025 Hou ...................... G06F 40/174
2007/0156393 A1 7/2007 Todhunter et al.
(Continued)

*Primary Examiner* — Daniel Abebe
(74) *Attorney, Agent, or Firm* — Alston & Bird LLP

(57) ABSTRACT

Various embodiments of the present invention provide methods, apparatuses, systems, computing devices, and/or the like that are configured to accurately and concisely generate one or more action item logs of one or more document data objects. For example, certain embodiments of the present invention provide methods, apparatuses, systems, computing devices, and/or the like that are configured to generate an action item log of a document data object comprising one or more semantically complete or incomplete units of text data, by generating content segmentation units, determining action item presence predictions, generating action item sets from each content segmentation unit within a candidate action item subset, aggregating the action item sets to create an action item log, and storing the action item log.

17 Claims, 14 Drawing Sheets

(56) References Cited

U.S. PATENT DOCUMENTS

| | | | |
|---|---|---|---|
| 2010/0235165 | A1 | 9/2010 | Todhunter et al. |
| 2012/0311584 | A1 | 12/2012 | Gruber et al. |
| 2013/0021344 | A1 | 1/2013 | Wang et al. |
| 2019/0129749 | A1 * | 5/2019 | White .................. G06Q 10/109 |
| 2021/0097502 | A1 * | 4/2021 | Hilleli ..................... G06F 40/30 |
| 2022/0067618 | A1 * | 3/2022 | Goli .................... G06F 18/2155 |
| 2022/0253605 | A1 * | 8/2022 | Tan ......................... G06F 40/30 |
| 2022/0284362 | A1 * | 9/2022 | Bellinger ............. G06Q 10/063 |
| 2022/0405709 | A1 | 12/2022 | Nouri et al. |
| 2025/0371317 | A1 * | 12/2025 | Thompson, III ..... G06N 3/0455 |

* cited by examiner

1000

By 5/1/2021, please finish the planning memo and send the memo over to the group. Please remember:
- The memo should include a full listing of activities for the upcoming quarter;
- The memo should assign each activity to a corresponding user; and
- The memo should be reviewed by two supervisors;
- Good luck!!!

FIG. 10

MACHINE LEARNING TECHNIQUES FOR SEMANTIC PROCESSING OF STRUCTURED NATURAL LANGUAGE DOCUMENTS TO DETECT ACTION ITEMS

CROSS-REFERENCE TO RELATED APPLICATIONS

This application is a continuation of and claims priority to U.S. Nonprovisional application Ser. No. 17/385,563, filed Jul. 26, 2021, the contents of which are hereby incorporated by reference in their entirety.

BACKGROUND

Various methods, apparatuses, and systems are configured to provide techniques for processing a document data object to generate a list of action items. Applicant has identified many deficiencies and problems associated with existing methods, apparatuses, and systems for generating an action item log for a document data object. Through applied effort, ingenuity, and innovation, these identified deficiencies and problems have been solved by developing solutions that are in accordance with the embodiments of the present invention, many examples of which are described in detail herein.

BRIEF SUMMARY

In general, embodiments of the present invention provide methods, apparatuses, systems, computing devices, and/or the like that are configured to effectively and efficiently generate one or more action item logs for one or more document data objects.

In accordance with another aspect, a computer program product is provided. The computer program product may comprise at least one computer-readable storage medium having computer-readable program code portions stored therein, the computer-readable program code portions comprising executable portions configured to: parse the content data to identify a plurality of content segmentation units; for each content segmentation unit, process the content segmentation using an action item classification machine learning model to determine an action item presence prediction for the content segmentation unit; determine, based on each action item presence prediction, a candidate action item subset of the plurality of content segmentation units; for each content segmentation unit in the candidate action item subset, process the content segmentation unit using an action item extraction machine learning model to generate an action item set for the content segmentation unit, wherein the action item extraction machine learning model comprises: (i) a part-of-speech tagger model that is configured to generate a part-of-speech tag sequence for the content segmentation unit, and (ii) a sequence processing model that is configured to generate the action item set based on the part-of-speech tag sequence; and generate the action item log based on each action item set for the candidate action item subset, wherein the action item log is configured to be used to generate action item log user interface data for an action item log user interface element, and wherein the action item log user interface element is configured to be displayed to an end user of a computing device.

In accordance with yet another aspect, an apparatus comprising at least one processor and at least one memory including computer program code is provided. In one embodiment, the at least one memory and the computer program code may be configured to, with the processor, cause the apparatus to: parse the content data to identify a plurality of content segmentation units; for each content segmentation unit, process the content segmentation using an action item classification machine learning model to determine an action item presence prediction for the content segmentation unit; determine, based on each action item presence prediction, a candidate action item subset of the plurality of content segmentation units; for each content segmentation unit in the candidate action item subset, process the content segmentation unit using an action item extraction machine learning model to generate an action item set for the content segmentation unit, wherein the action item extraction machine learning model comprises: (i) a part-of-speech tagger model that is configured to generate a part-of-speech tag sequence for the content segmentation unit, and (ii) a sequence processing model that is configured to generate the action item set based on the part-of-speech tag sequence; and generate the action item log based on each action item set for the candidate action item subset, wherein the action item log is configured to be used to generate action item log user interface data for an action item log user interface element, and wherein the action item log user interface element is configured to be displayed to an end user of a computing device.

In accordance with another aspect, a method. The method may include steps/operations that are configured to: parse the content data to identify a plurality of content segmentation units; for each content segmentation unit, process the content segmentation using an action item classification machine learning model to determine an action item presence prediction for the content segmentation unit; determine, based on each action item presence prediction, a candidate action item subset of the plurality of content segmentation units; for each content segmentation unit in the candidate action item subset, process the content segmentation unit using an action item extraction machine learning model to generate an action item set for the content segmentation unit, wherein the action item extraction machine learning model comprises: (i) a part-of-speech tagger model that is configured to generate a part-of-speech tag sequence for the content segmentation unit, and (ii) a sequence processing model that is configured to generate the action item set based on the part-of-speech tag sequence; and generate the action item log based on each action item set for the candidate action item subset, wherein the action item log is configured to be used to generate action item log user interface data for an action item log user interface element, and wherein the action item log user interface element is configured to be displayed to an end user of a computing device.

BRIEF DESCRIPTION OF THE SEVERAL VIEW OF THE DRAWINGS

Having thus described some embodiments in general terms, references will now be made to the accompanying drawings, which are not drawn to scale, and wherein:

Figure 5:
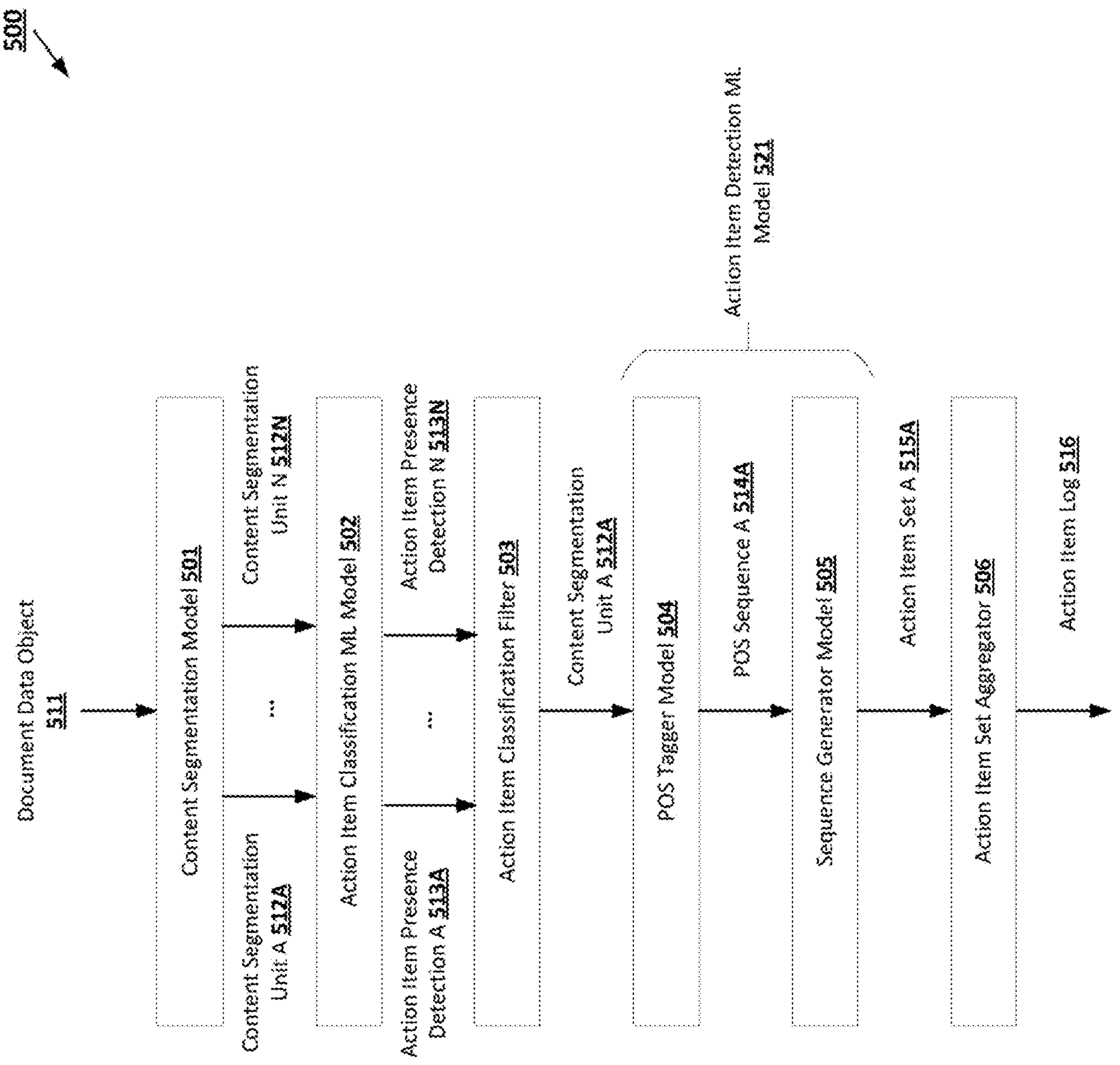

FIG. 5 provides an operational example of an action item extraction machine learning framework in accordance with at least some embodiments of the present invention.

Figure 6:
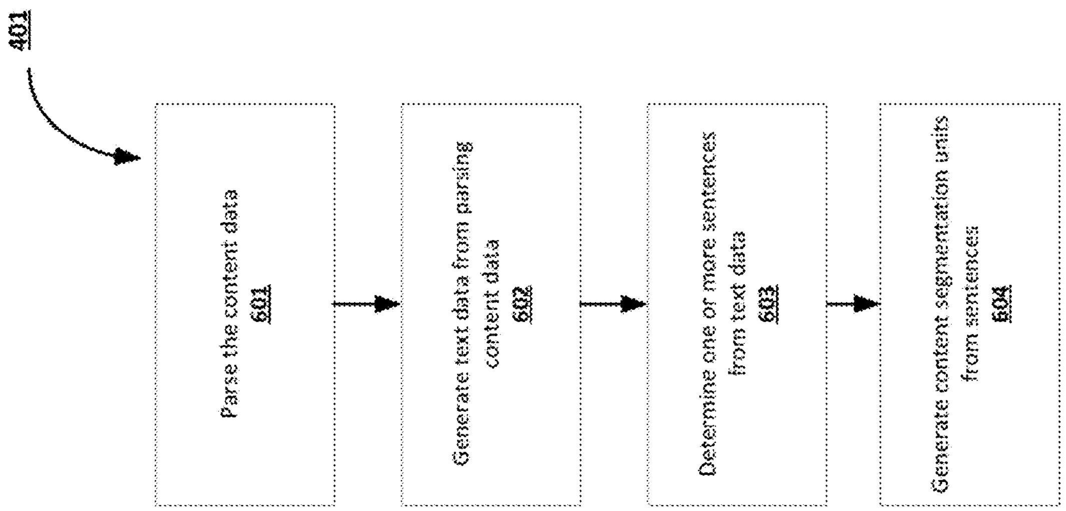

FIG. 6 is a flowchart diagram of an example process for identifying content segmentation units of a document data object in accordance with at least some embodiments of the present invention.

Figure 7:
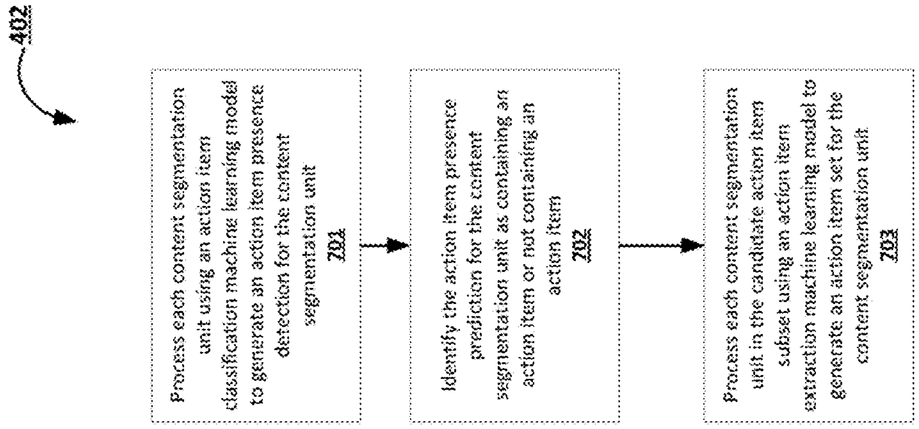

FIG. 7 is a flowchart diagram of an example process for generating an action item set for each content segmentation unit of a document data objects in accordance with at least some embodiments of the present invention.

Figure 8:
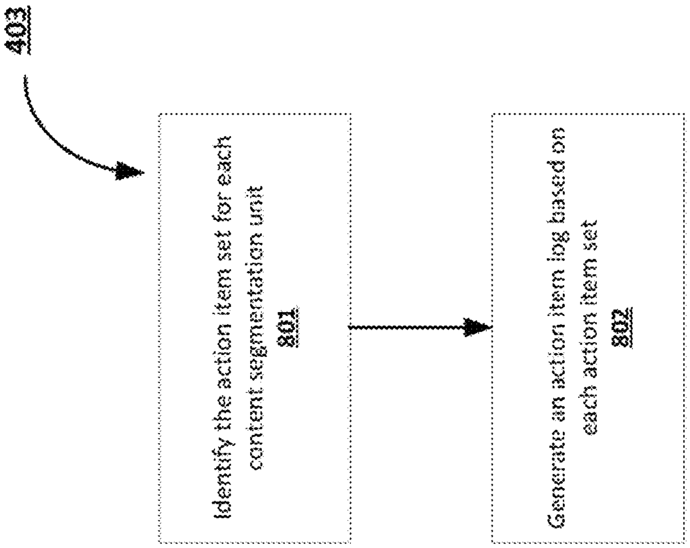

FIG. 8 is a flowchart diagram of an example process for generating action item log for the action item sets for the document data object in accordance with at least some embodiments of the present invention.

Figure 9:
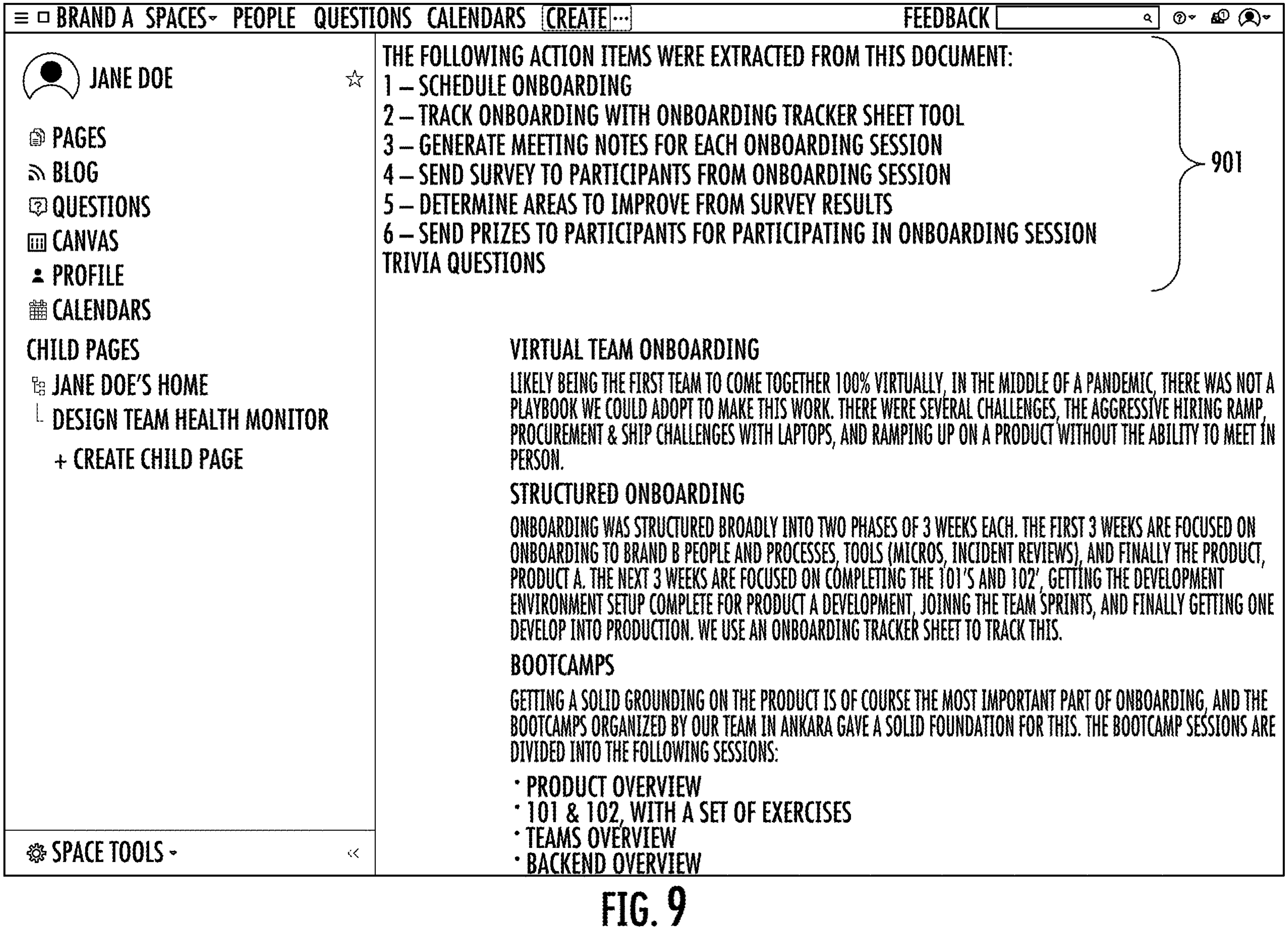

FIG. 9 provides an operational example of action item log user interface elements for a document data object that describes the action items extracted from a web-document in accordance with at least some embodiments of the present invention.

FIG. 10 provides an operational example of a document data object in accordance with at least some embodiments of the present invention.

Figure 11:
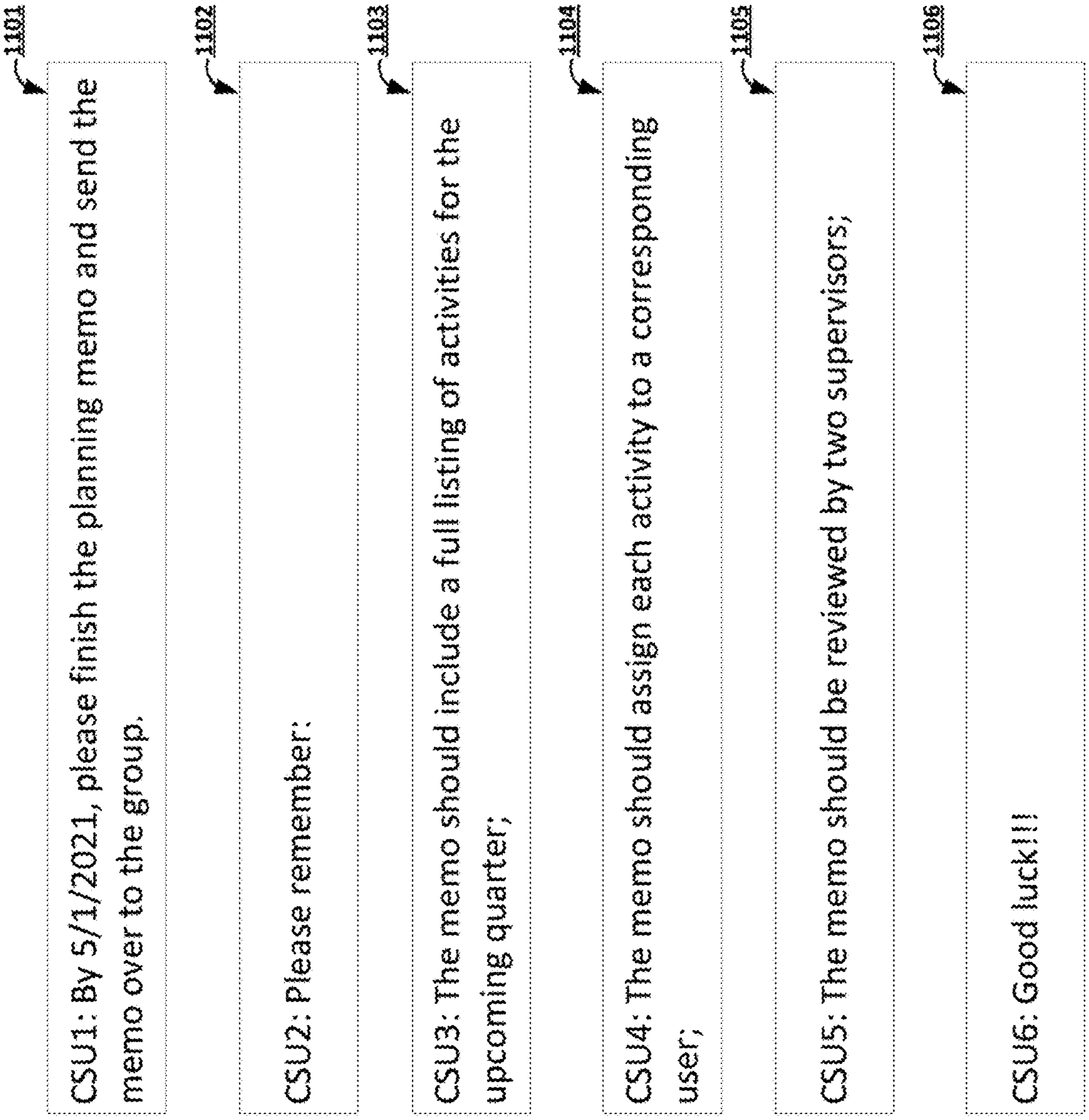

FIG. 11 provides an operational example of identifying content segmentation units of a document data object in accordance with at least some embodiments of the present invention.

Figure 12:
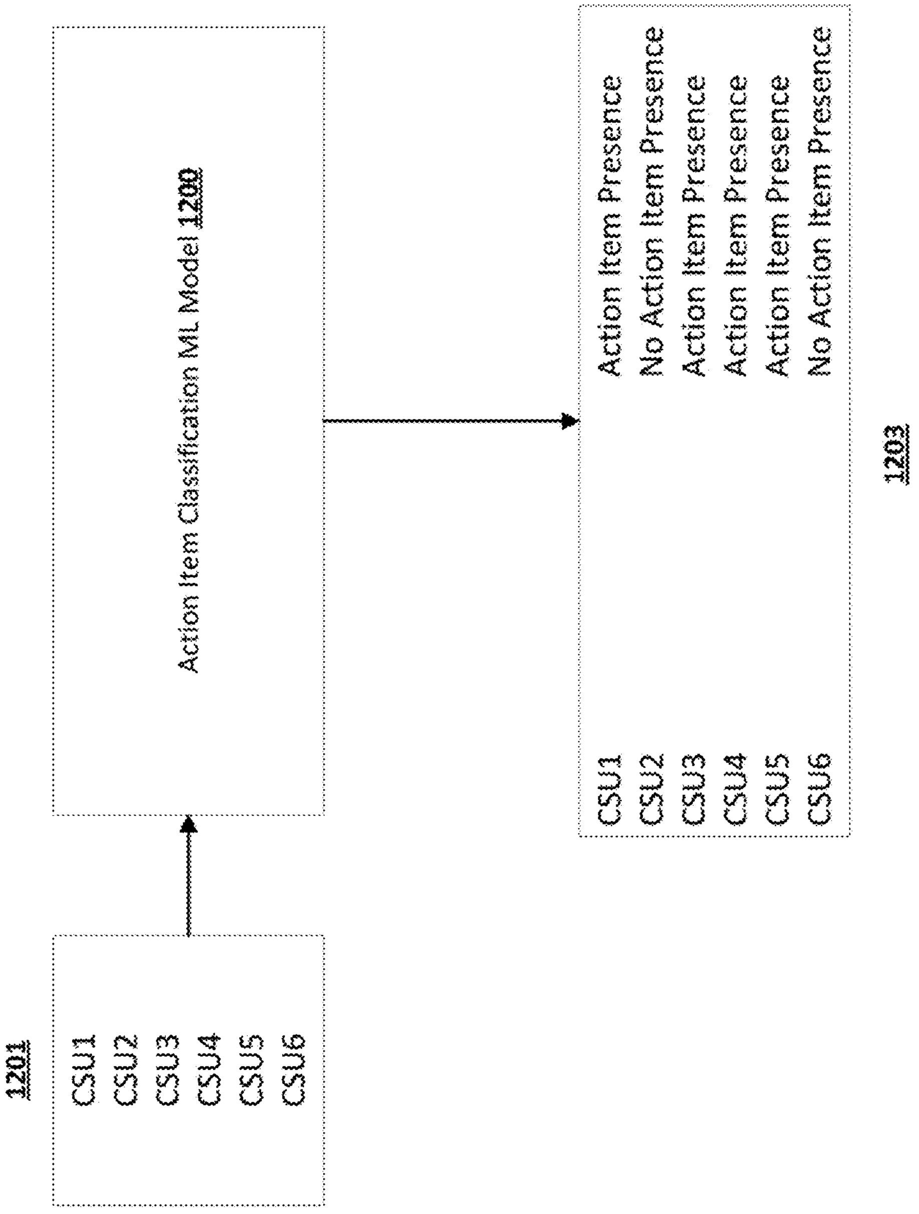

FIG. 12 provides an operational example of determining action item presence detections for a set of content segmentation units in accordance with at least some embodiments of the present invention.

Figure 13:
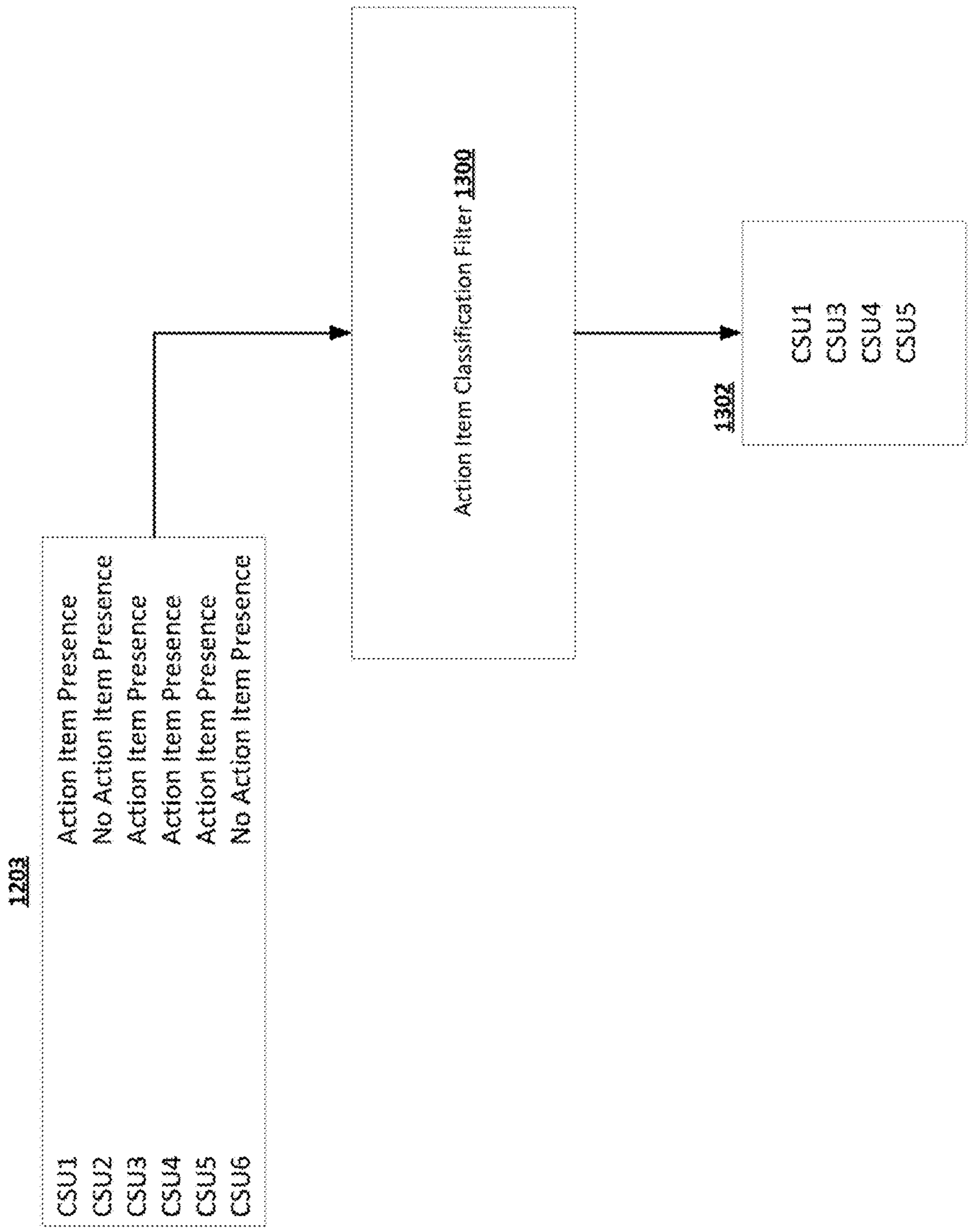

FIG. 13 provides an operational example of determining a candidate action item subset of a set of content segmentation units in accordance with at least some embodiments of the present invention.

Figure 14:
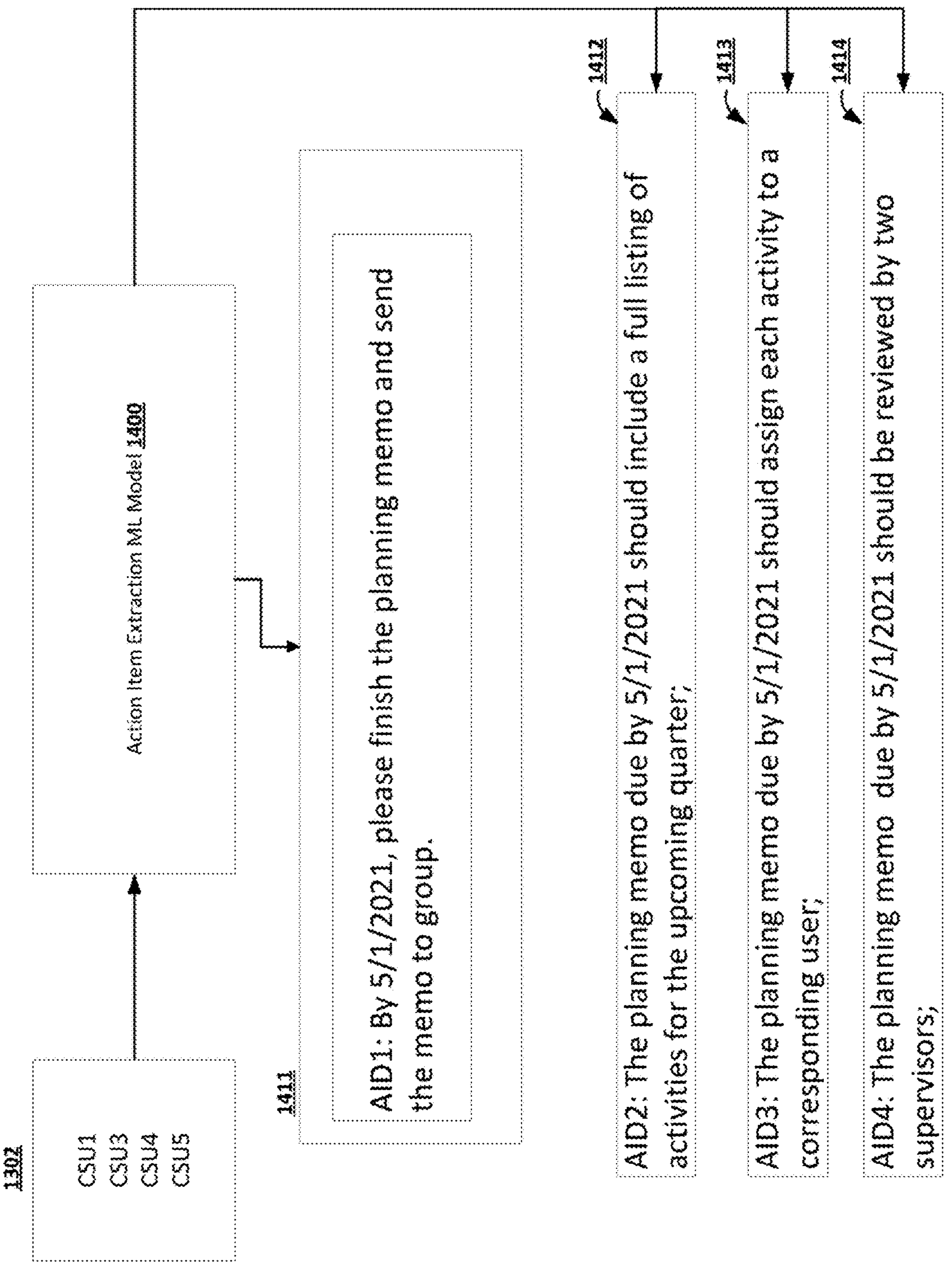

FIG. 14 provides an operational example of determining an action item set for each content segmentation unit in a candidate action item subset of a set of content segmentation units in accordance with at least some embodiments of the present invention.

DETAILED DESCRIPTION OF VARIOUS EMBODIMENTS

Various embodiments of the present invention now will be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

Various embodiments of the present invention address technical problems associated with generating action item logs of document data objects (e.g., web documents or other documents). The disclosed techniques can be utilized by a document collaboration server system to efficiently and reliably generate action item logs for document data maintained by a document collaboration server system. In this context, an end user may seek to easily and quickly access an action item log of the contents of a document data object. The claimed invention will likely increase the reliability/utility of an action item log that is presented to a user. An example of a document collaboration server system that may use the action item log generation techniques disclosed herein is the Confluence® collaborative document management platform that is owned by Atlassian PTY LTD.

Document collaboration server systems often store a large number of collaborative documents that may be accessible/editable by two or more user profiles. Each collaborative document may at each time be accessed by a group of user profiles that is larger than the group of user profiles that created the documents, and different portions of collaborative documents may be created by different user profiles.

A possible consequence of the large number of collaborative document creators in complex document collaboration server systems can be non-harmonious contents of various segments of multi-section documents, wherein multiple styles of writing may be used in various segments of multi-section documents. This places a large burden on end users accessing the multi-section documents who run into difficulties when reading and understanding each creator's writing style and assignment of action items for the user to complete. An action item log generation technique, like the one disclosed herein, can lessen this burden by accurately and concisely summarizing an entire document's action items in a succinct manner, which can in turn reduce the time a user may take to read a document and thus reduce operational load on a document collaboration server system. Moreover, the invention described herein may also decrease the number of document retrieval queries generated by confused end users who may generate more search queries looking for specific action items, such as by avoiding a scenario where an end user may conduct more search queries because the web document does not quickly display the action items outright in the beginning of the document. By reducing the number document retrieval queries and/or document retrieval queries transmitted to document collaboration server systems, various embodiments of the present invention reduce the operational load on document collaboration server systems.

Another technical challenge addressed by various embodiments of the present invention relates to the efficiency with which action item classification machine learning models and action item extraction machine learning models are able to learn complexities of different types of text data. Action item classification machine learning models and action item extraction machine learning models may be inefficient for processing particular text documents if said text documents are not parsed and content segmentation units are not generated wherein the content segmentation units comprise small portions of text (e.g., sentences or text data within an individual bullet of a bullet list). By parsing and extracting the content data from document data objects and feeding the individual sentences into the machine learning models, the machine learning models may be more efficient in processing the text data. The machine learning models may more efficiently and accurately select certain text and phrases to attach action item tags (by the action item classification machine learning model) or attach Part-of-Speech tags (by the action item extraction machine learning model). The assignment of tags by the machine learning models helps the action item classification machine learning model efficiently extract and process contents of a document data object to extract and generate a candidate action item subset, which in turn may be fed into the action item extraction machine learning model to generate an action item set, which are aggregated to create an action item log. An action item classification machine learning model and an action item extraction machine learning model that use the methods described herein may be trained using fewer training iterations than other machine learning models tasked with the same job to create model outputs. Accordingly, various embodiments of the present invention improve the training efficiency of the action item classification machine learning models and the action item extraction machine learning models and reduce the operational loads on computer systems that are configured to train these machine learning models.

Various embodiments of the present invention address challenges associated with the differing sets of content data which can be found in one or more documents by providing end users with action item log user interface elements that provide action items from content data using machine learning models to determine a candidate action item subset and then inputting the candidate action item subset into an action item extraction machine learning model to extract action item sets from the content data of documents and generate an action item log which parallels the sequence of action items within a corresponding document. The action item log produced by the invention described herein more closely parallels the action items described in the corresponding document, but without any unnecessary punctuation or text data that may not help a user determine the task described by the action item. The action item log described herein, thus, creates more efficient and concise descriptions of tasks to be completed by users than other systems. Importantly, in at least some of the noted embodiments, the action item log user interface is also designed to be automatically updated, in order to provide the most up-to-date renderings of the content data found in each document and facilitate reliable and efficient analysis of the action items from the content data by the end users. End users are able to quickly decide whether the document should be read more fully based on the action item log and whether the action items described in the action item log lead the end user to read the corresponding document more fully to understand the nuances of how to complete the action items described, or whether to move on to another document (and the document's action item log) due to lack of the correct subject-matter found in the current document. One objective of the noted embodiments is to increase action item longs presented to end users of a document collaboration server system.

Accordingly, various embodiments of the present invention reduce the amount of time an end user may take to read and understand the subject matter of a document and action items within a document, reduce the computational time it takes for a machine learning model to generate an action item log from the content data of a document, and reduce the creation of less accurate and less concise action item logs. Moreover, various other embodiments of the present invention reduce the amount of time it may take for a machine learning model trained to generate action item logs to create an action item log user interface to be presented to an end user, a feature that is enabled by presenting one or more action item log user interface elements.

Definitions

As used herein, the term "action item log" refers to a data entity that describes a set of predicted action items that are extracted from a corresponding webpage. The action item log is generated by a document collaboration server computing device. The action item log is used to generate action log item user interface data that is transmitted by the document collaboration server computing device to a client computing device. In some embodiments, the action item log is an output summary of the action items of the claimed invention, including paraphrased content of a text input. Aspects of the claimed invention may create a list or summary of action items of the text input by using an action item classification machine learning model and/or an action item extraction machine learning model. The text, contents, data, and other media within each action item log is capable of being transmitted, received, and/or stored in accordance with embodiments of the present invention. For instance, the present invention describes storing the action item log for automatic retrieval when a user tries to access the web document for which the action item log was extracted, parsed, and run through the action item extraction of the present invention. An action item may include words or phrases meant to convey a discrete task that must be accomplished or performed. For example, action items may include phrases such as "Review document X" or "Summarize document Y."

As used herein, the term "document data object" refers to a data entity that describes content data (e.g., text data, image data, or the like) associated with a document. A document data object may be generated by document metadata associated with a document, where the document metadata may be generated by a document collaboration server computing device and stored in a storage subsystem of the document collaboration server computing device. The document data object is processed by the document collaboration server computing device to generate an action item log for the document data object. The text, contents, data, and other media within each document data object is capable of being transmitted, received, and/or stored in accordance with embodiments of the present invention. The text, content, data and other media may be sent and received between multiple computers, multiple servers, and it may pass through multiple relays, routers, network access points, base stations, hosts, and/or the like, which is sometimes referred to as a "network." Similarly, where a computing device is described herein to send text, contents, data, and other media to another computing device, it will be appreciated that the data may be sent directly to another computing device or may be sent indirectly via one or more intermediary computing devices, such as, one or more servers, relays, routers, network access points, base stations, hosts, and/or the like.

As used herein, the term "structured document data object" refers to a data entity that describes a document data object that is associated with structural definition data defining a specific structure for the document data object. A structured document data object may be generated by a specific structure of document metadata associated with a document, where the document metadata may be generated by a document collaboration server computing device and stored in a storage subsystem of the document collaboration server computing device. The structured document data object may be processed by the document collaboration server computing device to generate an action item log comprising a specific structure for the structured document data object. For instance, a specific structure for a structured document data object may be organized based on headings, sub-headings, paragraphs, sentences, lists, tables, or the like and may have a certain defined hierarchy of content metadata as described on the back-end of the document collaboration server computing device. For example, metadata that is organized under first-level headings may have multiple sections corresponding with each first-level heading. The same can be true for a document comprising both first-level headings and second-level headings, where the multiple sections in a document may comprise the metadata within all first-level headings, or the multiple sections in a document may correspond to all the second-level headings within each first-level heading and the multiple sections may be demarcated by said second-level headings. This hierarchy can also include segments and sections based off different formatting options. For instance, a document could split up sections by applying different font styles and typefaces to text and other media, different font sizes, different paragraph spacing, different margin sets, inputting horizontal lines to breakup text, inputting blank areas to breakup text, different text colors, different tab spacing, or different indentations. Additionally, if there is a specific format for a document, such as the Atlassian Document Format (ADF), then a multi-section document may be split up based on the format of the specific document type.

The document metadata may be generated by an end-user through the end user's interactions with the client computing device, wherein the end-user may type out pieces of data into a web-based document within the document collaboration server computing device and after the end-user has established that they are ready for publication or storage of the data, the end-user may submit the document for storage to the storage subsystem via a storage server. After the data is stored in the storage subsystem, the data may be generated back to the end-user through the document collaboration server computing device with the correct sections and hierarchy of headings and subheadings as demarcated on the back-end as created by the end-user. For instance, an ADF document is created using a hierarchy of nodes, wherein each line of text and its corresponding chosen format are defined within the structure of the nodes. In ADF, there are two different categories of nodes: block nodes and inline nodes. First, block nodes denote the structural elements of the document, such as headings, paragraphs, lists, or tables. Second, inline nodes denote the content of those structural elements, such as text and images. Additionally, the category of inline nodes may also include text marks, which are used to control text formatting such as italics or bolding. In some embodiments, within each block node, there may be a root block node, a top-level block node, or a child block node to further describe the structure of the document. In ADF, the root block node is used to create every document and each root block node comprises a version, a document type, and a content area. The top-level block nodes then further describe the structure of the content within the root block node by denoting whether there is a paragraph, a table, a list, or another format in which to structure the content of the document. The child block nodes are then used to further structure the content within the top-level block by denoting whether the contents should be a table cell, table header, media, or a list item. Other hierarchies of nodes and headings may be selected for documents not in ADF, such a hierarchy of nodes and sections may comprise delineating headings and sub-headings within a document and then extracting the corresponding text or images underneath each heading or sub-heading, such as a hierarchy based off section headings.

As used herein, the term "content segmentation unit" refer to a data entity that describes a semantic segment of a document data object that is deemed to describe a coherent and self-contained meaning. The content segmentation units may be generated by a document collaboration server computing device. The content segmentation units are processed by the document collaboration server computing device to generate individual content segmentation units from the document data object. The sectioning (or segmentation) may be based on headings, sub-headings, sentences, text, and the like which is used to describe the hierarchy of the contents within the document. A document may have multiple sections depending on how the metadata is organized. The content segmentation units may also be sectioned (or segmented) based on sentences within the metadata of a document. The content segmentation units may also be sectioned according to headings in the document. In some embodiments, document segmentation units correspond to bullet points within a document data object. In some embodiments, a content segmentation unit describes a single semantically complete unit of text data (i.e. content data) that is extracted from a document data object. A content segmentation unit may be generated by a document collaboration server computing device. The content segmentation unit is processed by the document collaboration server computing device to generate an action item presence prediction for the content segmentation unit. The contents of the content segmentation unit may be determined by breaking up (or chunking) the contents of the content segmentation units (described above) based on the hierarchy of sections, sentences, and/or the nth-level headings within a document's metadata. The content segmentation unit may be input into a machine learning model, such as the action item classification machine learning model or the action item extraction machine learning model.

As used herein, the term "action item classification machine learning model" refers to a data entity that describes parameters, hyper-parameters, and/or defined operations of a machine learning model that is configured to process a content segmentation unit to generate an action item presence prediction for the content segmentation unit. The action item classification machine learning model may be trained to recognize textual patterns indicative of presence of actions items using examples of content data (e.g., text data), wherein each example content data either contains action items or does not contain action items and the action item classification machine learning model is given an indication of whether the example content data contains action items or does not contain action items. The action item classification machine learning model may be stored in the storage subsystem of the document collaboration server system.

The action item classification machine learning model may be trained to recognize certain textual patterns within datasets based on certain parameters and objectives, and then the action item classification machine learning model may be configured to detect the noted textual patterns. Specifically, the action item classification machine learning model may be trained to determine whether an input of text data includes an action item. The action item classification machine learning model may use a variety of different learned text and phrases to complete its task. The action item classification machine learning model may use learned text and phrases to compare input content data to classify the input content data as containing action items or not containing action items.

In some embodiments, a machine learning model that may be used for the action item classification machine learning model is the Bidirectional Encoder Representations from Transformers (BERT) model. The BERT model may be used to generate a representation of the text data to determine whether the text data input contains an action item. BERT may be pre-trained on a vast text corpus to learn to assess based on sentence context instead of other methods which may rely on n-grams or specific phrases. In some of the noted embodiments, the BERT model may be fine-tuned with the use of custom data produced for pre-training purposes. In some of the noted embodiments, certain text (or words), and the corresponding sentences, may be put through a custom BERT model to grammatically tag the context of the words and phrases within the sentence.

As used herein, the term "structural scheme" refers a data entity that describes one or more structural/organizational metadata associated with contents of a document data object. The structural scheme of a document data object may be generated by document metadata associated with a document, where the document metadata may be generated by a document collaboration server computing device and stored in a storage subsystem of the document collaboration server computing device. The structural scheme is processed by the document collaboration server computing device to generate a structured document data object. For instance, one example of a possible structural scheme for a document data object may be a structure of metadata based on nth-level headings, or the structure of the metadata is broken up between first-level headings and second-level headings. The structural scheme of a document data object may be defined and generated by an end-user through their interactions with the client computing device, wherein the end-user may type out pieces of data into a web-based document within the document collaboration server computing device. The end-user may submit the document for storage to the storage subsystem via a storage server. The end-user may also submit the document for publication. After the data is stored in the storage subsystem, the data may be generated back to the end-user through the document collaboration server computing device with the correct structural scheme and hierarchy of headings and subheadings as demarcated on the back-end as created by the end-user.

As used herein, the term "predefined structural elements" refers to a data entity that describes the content metadata comprising a specific organization of a document data object's content data beyond headings, subheadings, paragraphs, or sentences. For instance, a predefined structural element of a document data object may comprise bullet lists, numbered lists, or a combination thereof of content data within the document data object. The predefined structural elements may be generated by document metadata associated with a document, wherein the document metadata may be generated by a document collaboration server computing device and stored in a storage subsystem of the document collaboration server computing device. The predefined structural elements may be processed by the document collaboration server computing device to generate a structured document data object. In some embodiments, the predefined structural elements comprise action item declarations, such as action item declarations using specialized action item declarations widgets in ADF.

As used herein, the term "action item set" refers to a data entity that describes the action items identified in a content segmentation unit through processing the content segmentation unit by an action item extraction machine learning model. The action item set may be the output of the action item extraction machine learning model which may identify and extract one or more action items within the content segmentation unit. The action item set may be used by the document collaboration server computing device to process the content segmentation units containing action items (identified by the action item classification machine learning model) through the action item extra extraction ctor machine learning model to generate an action item set. The action item set may be processed by the document collaboration server computing device to generate an action item log. In some embodiments, the output of the action item extraction machine learning model may comprise summaries of the action items from a text input. For instance, a text input sentence which may state, "Please do the dishes and clean the windows" may create an action item set comprising "do the dishes" and "clean the windows." The summarization of the action items may be determined by defining a tag pattern within a part-of-speech tagger (discussed above).

As used herein, the term "sequence processing model" refers to a data entity that describes a model that is configured to process a part-of-speech tag sequence for a content segmentation unit to generate an action item set for the content segmentation unit. In some embodiments, the output of the sequence processing model is configured to preserve an order for outputting the action item set by corresponding the sequence of outputs with the sequence of content data within the document and the part-of-speech tag sequence. For instance, if the input or sentence X comes before the input of Y within the document, then the inputs will be fed through the action item classification machine learning model and the action item extraction machine learning model in the same sequence. The sequence processing model may be generated by the order of text data within the content segmentation unit associated with a document, wherein the content segmentation unit determines the correct sequence for the action item set from the part-of-speech tag sequence. The sequence processing model is processed by the document collaboration server computing device to generate an action item set of the content segmentation unit. Additionally, if a term or set of characters (e.g., a word) comes before another term or set of characters within a sentence, then those terms or sets of characters are fed through the action item classification machine learning model and the action item extraction machine learning model in the same sequence.

Example System Architecture

Methods, apparatuses, and computer program products of the present invention may be embodied by any of a variety of devices. For example, the method, apparatus, and computer program product of an example embodiment may be embodied by a networked device (e.g., an enterprise platform), such as a server or other network entity, configured to communicate with one or more devices, such as one or more query-initiating computing devices. Additionally, or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

Figure 1:
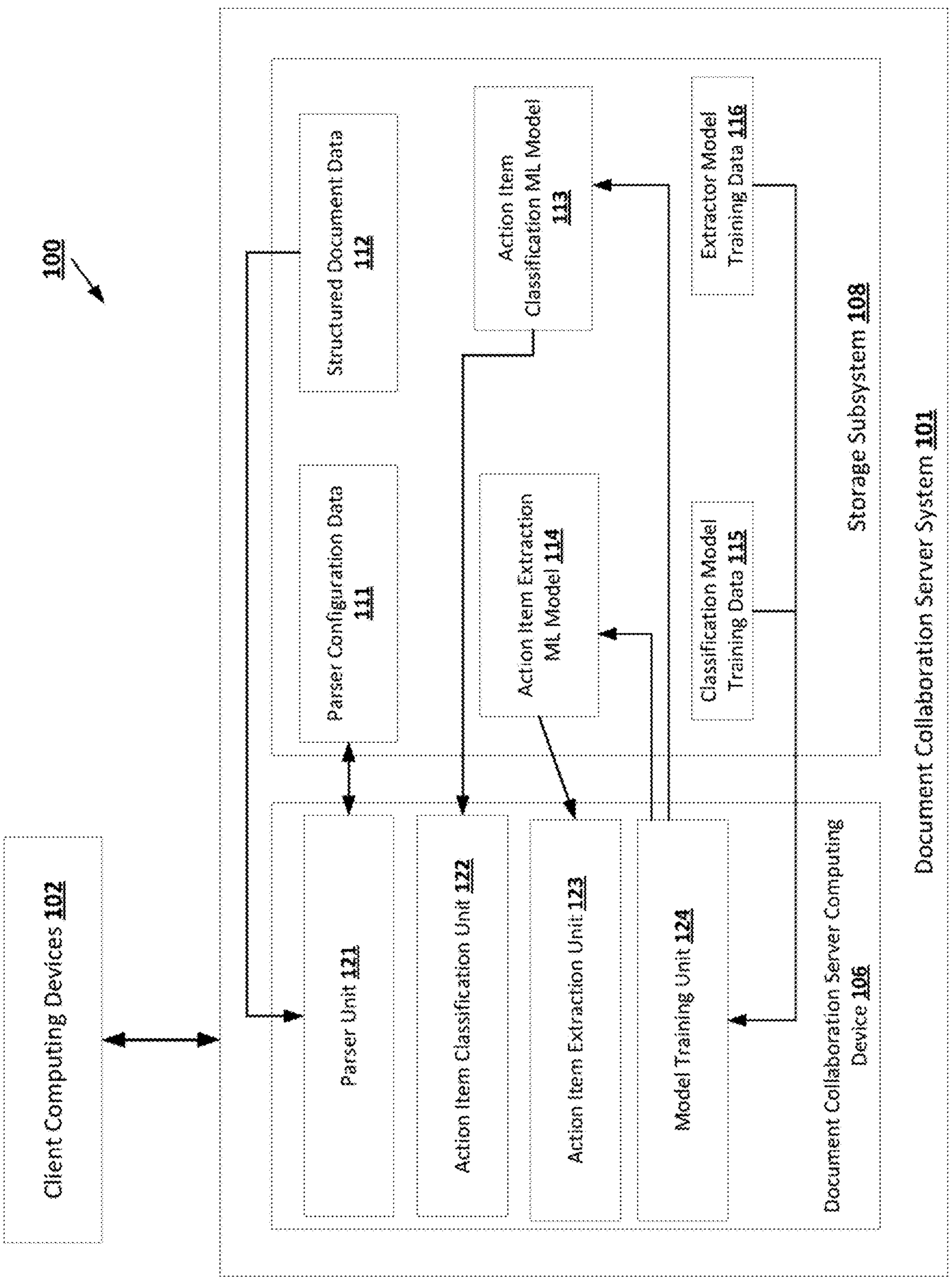
FIG. 1 is a block diagram of an example action item log document collaboration server system architecture within which at least some embodiments of the present invention may operate.

FIG. 1 depicts an exemplary architecture 100 for generating an action item log user interface data. The architecture 100 includes one or more client computing devices and a document collaboration server system 101. The document collaboration server system 101 is configured to store collaborative documents in a storage subsystem 108, provide the collaborative and non-collaborative documents in response to user queries transmitted by the client computing devices 102, receive action item extraction requests from client computing devices 102, and provide action item logs in response to the noted action item extraction requests.

The document collaboration server system 101 may include a document collaboration server computing device 106 and a storage subsystem 108. The document collaboration server computing device 106 may be configured to receive action item extraction requests from client computing devices 102, as well as generate and provide action item logs in response to the noted action item extraction requests. The document collaboration server computing device 106 may be configured to generate and utilize an action item classification machine learning model 113 and an action item extraction machine learning model 114. The storage subsystem 108 may be configured to store training data used by the document collaboration server computing device 106 to generate and provide action item logs in response to the noted action item extraction requests, as well as the training data collaboration server computing device 106 to generate the action item classification machine learning model 113 and the action item extraction machine learning model 114. Examples of such training data include action item data and ADF parsed data (e.g., checkboxes, bullet points, etc.). The storage subsystem 108 may further be configured to store structured document data 112 related to document data objects with The document collaboration server computing device 106 comprises a parser unit 121, an action item classification unit 122, an action item extraction unit 123, and a model training unit 124. The parser unit 121 is configured to retrieve a document data object associated with an action item extraction request from the structured document data 112 stored by the storage subsystem 108 and parse the document data object in accordance with the parse configuration data 111 in order to generate a parsed document data object. The action item classification unit 122 is configured to detect content segmentation units in the parsed document data object, detect an action item presence detection for each content segmentation unit by processing the content segmentation unit using the action item classification machine learning model 113, and generate a candidate action item subset of the set of content segmentation units that are associated with affirmative action item presence detection. The action item extraction unit 123 is configured to process each content segmentation unit in the candidate action item subset using the action item extraction machine learning model 114 to generate an action item set for the content segmentation units, and then combine the action item sets for content segmentation units in the candidate action item subset to generate the action item log for the document data object. The model training unit 124 is configured to: (i) generate the action item classification machine learning model 113 based on the classification model training data 115 stored by the storage subsystem 108, and (ii) generate the action item extraction machine learning model 114 based on the extraction model training data 116 stored by the storage subsystem 108.

The client computing devices 102 and the document collaboration server computing device 106 may communicate over one or more networks. A network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, a network may include a cellular telephone, an 802.11, 802.16, 802.20, and/or WiMax network. Further, a network may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. For instance, the networking protocol may be customized to suit the needs of the page management system. In some embodiments, the protocol is a custom protocol of JavaScript Object Notation (JSON) objects sent via a WebSocket channel. In some embodiments, the protocol is JSON over RPC, JSON over REST/HTTP, and the like.

Exemplary Document Collaboration Server Computing Device

Figure 2:
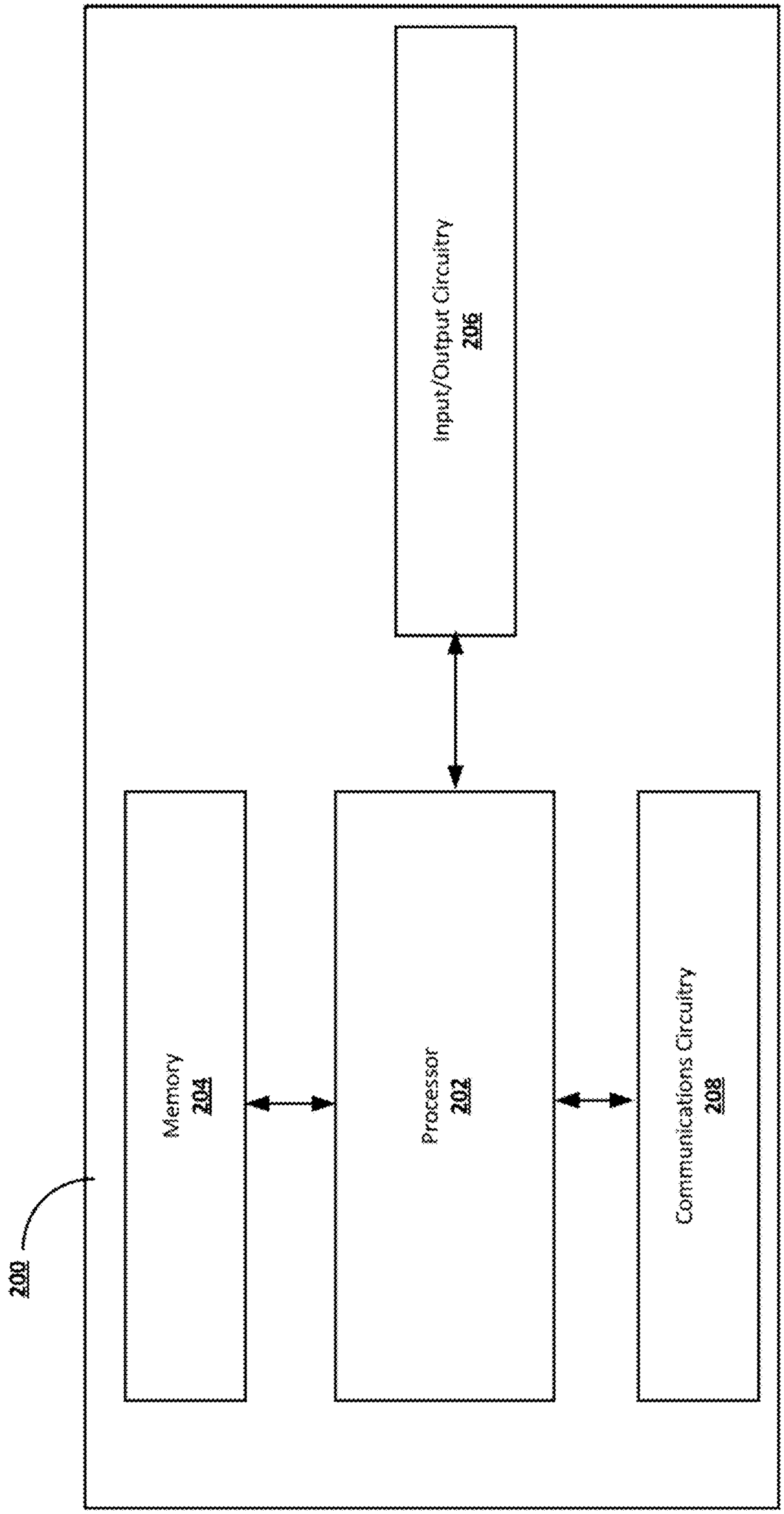
FIG. 2 is a block diagram of an example document collaboration server computing device structured in accordance with at least some embodiments of the present invention.

The document collaboration server computing device 106 may be embodied by one or more computing systems, such as apparatus 200 shown in FIG. 2. The apparatus 200 may include processor 202, memory 204, input/output circuitry 206, and communications circuitry 208. The apparatus 200 may be configured to execute the operations described herein. Although these components 202-208 are described with respect to functional limitations, it should be understood that the particular implementations necessarily include the use of particular hardware. It should also be understood that certain of these components 202-208 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a query-initiating computing device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally, or alternatively, the communications circuitry 208 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Exemplary Client Computing Device

Figure 3:
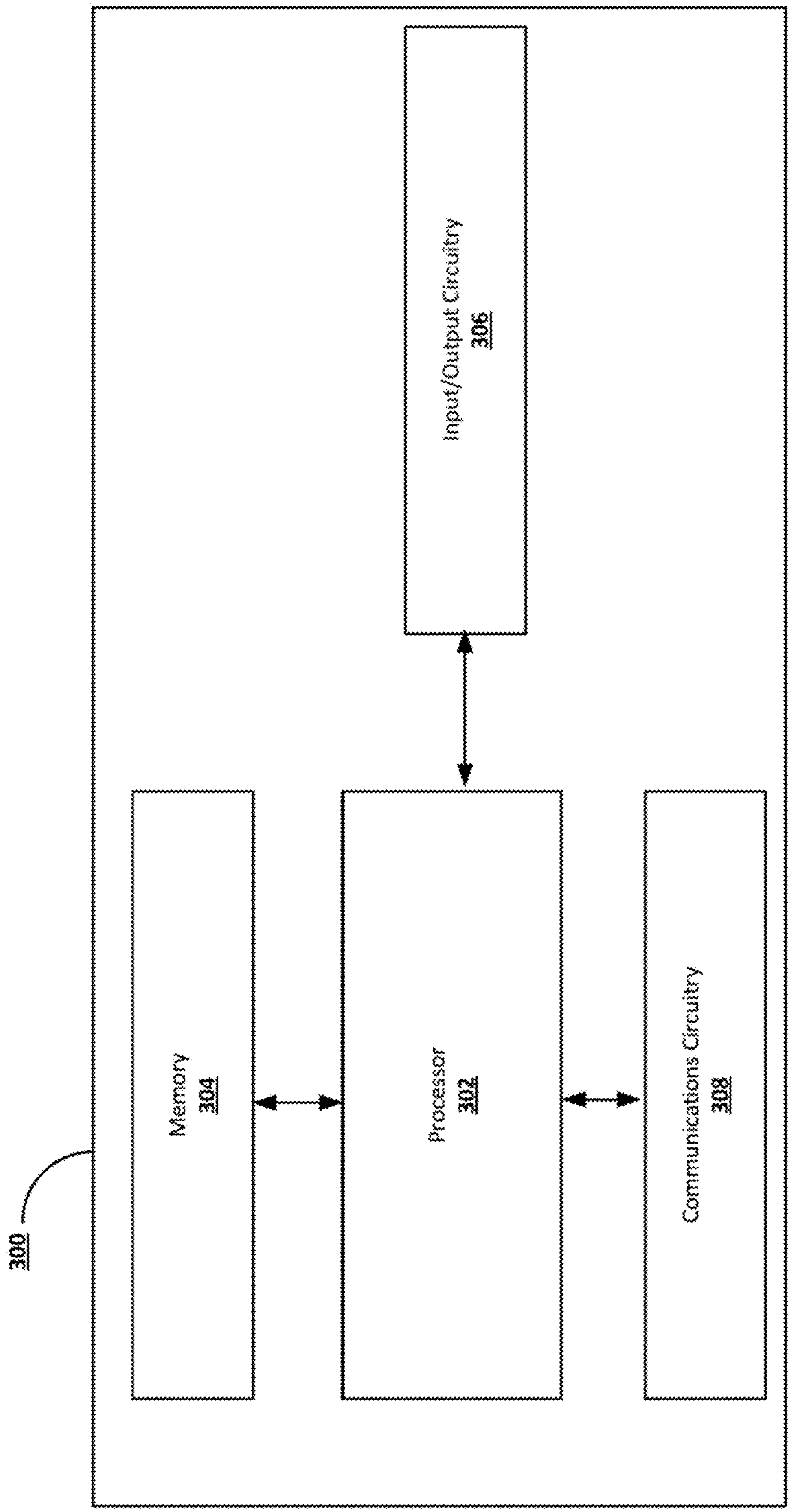
FIG. 3 is a block diagram of an example client computing device structured in accordance with at least some embodiments of the present invention.

Referring now to FIG. 3, a client computing device may be embodied by one or more computing systems, such as apparatus 300 shown in FIG. 3. The apparatus 300 may include processor 302, memory 304, input/output circuitry 306, and a communications circuitry 308. Although these components 302-308 are described with respect to functional limitations, it should be understood that the particular implementations necessarily include the use of particular hardware. It should also be understood that certain of these components 302-308 may include similar or common hardware. For example, two sets of circuitries may both leverage use of the same processor, network interface, storage medium, or the like to perform their associated functions, such that duplicate hardware is not required for each set of circuitries.

In some embodiments, the processor 302 (and/or co-processor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may include one or more databases. Furthermore, the memory 304 may be configured to store information, data, content, applications, instructions, or the like for enabling the apparatus 300 to carry out various functions in accordance with example embodiments of the present invention.

The processor 302 may be embodied in a number of different ways and may, for example, include one or more processing devices configured to perform independently. In some preferred and non-limiting embodiments, the processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 302 may be configured to execute instructions stored in the memory 304 or otherwise accessible to the processor 302. In some preferred and non-limiting embodiments, the processor 302 may be configured to execute hard-coded functionalities. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions (e.g., computer program instructions), the instructions may specifically configure the processor 302 to perform the algorithms and/or operations described herein when the instructions are executed.

In some embodiments, the apparatus 300 may include input/output circuitry 306 that may, in turn, be in communication with processor 302 to provide output to the user and, in some embodiments, to receive an indication of a user input. The input/output circuitry 306 may comprise a user interface and may include a display, and may comprise a web user interface, a mobile application, a query-initiating computing device, a kiosk, or the like.

In embodiments in which the apparatus 300 is embodied by a limited interaction device, the input/output circuitry 306 includes a touch screen and does not include, or at least does not operatively engage (i.e., when configured in a tablet mode), other input accessories such as tactile keyboards, track pads, mice, etc. In other embodiments in which the apparatus is embodied by a non-limited interaction device, the input/output circuitry 306 may include may include at least one of a tactile keyboard (e.g., also referred to herein as keypad), a mouse, a joystick, a touch screen, touch areas, soft keys, and other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally, or alternatively, the communications circuitry 308 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

Example Data Flows and Operations

Provided below are techniques for generating an action item log of a document data object. In some embodiments, a document data object is a document (e.g., web document) including content data (e.g., text data) comprising one or more sentences or one or more semantically complete units of text data. A document data object comprising one or more semantically complete units of text data may be defined by document content data associated with the document data object, where the document data object's content data are generated by a document collaboration server computing device and stored in a storage subsystem that is associated with the document collaboration server computing device.

In some embodiments, the content data of the document data object may be sectioned according to headings, subheadings, text, images, graphs, and the like to describe the hierarchy of the contents within the document. In some embodiments, sections of the document may be determined based on content data associated with the document as well as segmentation guidelines for generating sections based on documents. For example, content data that is organized under first-level headings may have multiple sections corresponding with each first-level heading. The same can be true for a document comprising both first-level headings and second-level headings, where the multiple sections in a document may comprise the content data within all first-level headings, or the multiple sections in a document may correspond to all the second-level headings within each first-level heading and the multiple sections may be demarcated by said second-level headings. This hierarchy can also include segments and sections based off different formatting options. For instance, a document could split up sections by applying different font styles and typefaces to text and other media, different font sizes, different paragraph spacing, different margin sets, inputting horizontal lines to breakup text, inputting blank areas to breakup text, different text colors, different tab spacing or different indentations. Additionally, if there is a specific format for a document, such as the Atlassian® Document Format (ADF), then a multi-section document may be split up based on the hierarchical taxonomy of documents defined by the specific format.

A content segmentation unit of a document data object may be described as a semantically complete unit of text data and/or semantically incomplete unit of text data (e.g., bullet or number lists of content data). A content segmentation unit is defined by document content data associated with a document data object, where the document content data is generated by a document collaboration server computing device. The document content data is used to visually demarcate semantically complete units of text data and/or semantically incomplete units of text data of a corresponding document data object within a document user interface that is displayed by the client computing device to an end user of the client computing device. The content segmentation units may be generated from the content data based on semantically complete units of text data (e.g., content segmentation units may be generated by sentences from the content data) or the content segmentation units may be generated from the content data based on semantically incomplete units of text data (e.g., content segmentation units may be generated from text from each individual bullet point on a bullet or numbered list).

In another embodiment, the content segmentation units may be generated based on a headings, sub-headings, text, tables, or the like, which may be used to describe the hierarchy of the content data within the document data object. In some embodiments, a content segmentation unit may comprise a set of paragraphs of the content data associated with the document data object, including paragraphs associated with first-level headings and/or all second-level headings. The contents of each content segmentation unit are configured to be transmitted, received, and/or stored in accordance with embodiments of the present invention. The contents of each content segmentation unit may be configured to be transmitted between multiple computers and/or multiple servers, and such transmissions may pass through multiple relays, routers, network access points, base stations, hosts, and/or the like. Where a computing device is described herein to send content data associated with one or more content segmentation units to another computing device, it will be appreciated that the content data may be sent directly to another computing device or may be sent indirectly via one or more intermediary computing devices, such as using one or more servers, relays, routers, network access points, base stations, hosts, and/or the like.

Figure 4:
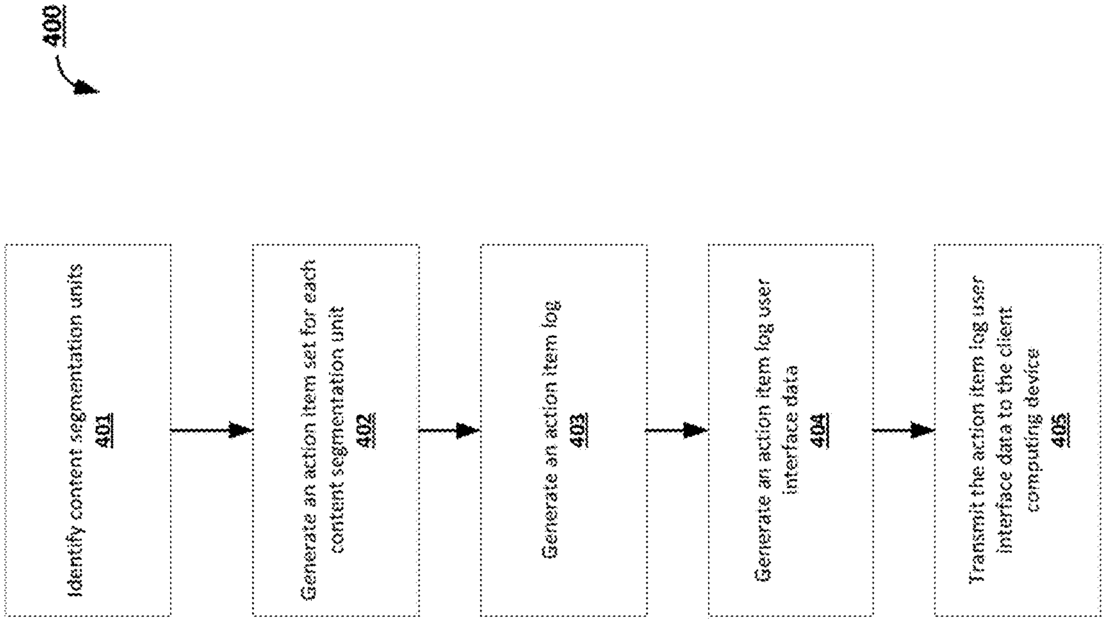
FIG. 4 is a flowchart diagram of an example process for generating action item log user interface data for a document data object with at least some embodiments of the present invention.

FIG. 4 is a flowchart diagram of an example process 400 for performing operations that are configured to transmit action item log user interface data for a document data object to a client computing device 102. Via the various operations of the process 400, the document collaboration server computing device 106 can generate action item user interface data that are in turn transmitted to the client computing device 102 for presentation of one or more action item user interface elements to an end user of the client computing device 102.

The process 400 begins at operation 401 when the document collaboration server computing device 106 identifies the content segmentation units of the document data object. The content segmentation units for the document data object may describe semantically complete units of content data or semantically incomplete units of content data from within the document data object.

For example, as depicted in FIG. 11, the content segmentation units CSU1-CSU6 1101-1106 are extracted from the document data object 1000 of FIG. 10. As depicted in FIG. 11, some of the content segmentation units (e.g., content segmentation units CSU1-CSU2 1001-1002) are determined based on sentences extracted from the document data object 1000 of FIG. 10, while some of the content segmentation units (e.g., content segmentation units CSU3-CSU6 1003-1006) are determined based on structural elements associated with the document data object 1000, in this case the bullet point demarcations associated with the document data object 1000.

In some embodiments, operation 401 may be performed with respect to the content data of the document data object in accordance with the process that is depicted in FIG. 6. The process that is depicted in FIG. 6 begins at operation 601 when the document collaboration server computing device 106 parses the content data of the document data object. In some embodiments, the document collaboration server computing device 106 first retrieves the document data object from the storage subsystem 108. In some embodiments, the content data of the document data object is then extracted using the extractor configuration data unit 113 and parsed by the parser unit 121. Once the content data is parsed, the text data may be generated from the parsed content data.

At operation 602, the document collaboration server computing device 106 generates the text data from parsing the content data of the document data object. In some embodiments, operation 602 includes the process of extracting the content data from the document data object from the parser unit 106 to the action item classification unit 123. In some embodiments, the parsing of the content data may include the removal of unnecessary punctuations or tokens, weblinks, and other unnecessary aspects of the content data.

At operation 603, the document collaboration server computing device 106 determines the semantically complete units of text data (i.e., sentences) from the text data. In some embodiments, operation 603 includes the process of determining semantically incomplete units of text data from the text data.

At operation 604, the document collaboration server computing device 106 generates the content segmentation units from the identified semantically complete units of text data. For instance, each semantically complete unit of text generates a single content segmentation unit. The content segmentation units may be aggregated just like the semantically complete units may be aggregated to display the text data as representative of the content data from the document data object. In some embodiments, the document collaboration server computing device 106 may generate the content segmentation units from identified semantically incomplete units of text data, such as bullet or number lists. In some embodiments, the document collaboration server computing devices 106 may generate the content segmentation units from both the identified semantically complete units of text data and the identified semantically incomplete units of text data in order to create a more detailed and complete action item log.

At operation 402, the document collaboration server computing device 106 generates an action item set for each content segmentation unit by providing each content segmentation unit to the action item classification machine learning model and to the action item extraction machine learning model.

In some embodiments, operation 402 may be performed with respect to the content data of the document data object in accordance with the process that is depicted in FIG. 7. The process that is depicted in FIG. 7 begins at operation 701 when the document collaboration server computing device 106 parses the content data of the document data object. In some embodiments, the document collaboration server computing device 106 may run the process of one or more action item content segmentation units through one or more machine learning models.

At operation 701, the document collaboration server computing device 106 processes one or more content segmentation units by providing each content segmentation unit to an action item classification machine learning model to generate an action item presence prediction. Each model output of the action item classification machine learning model may include a tag to attach to the content segmentation unit, wherein the tag may comprise a indication that the content segmentation unit "contains action items" or "does not contain action items," or some combination thereof. In some embodiments, the tags output by the action item classification machine learning model may include other forms to indicate the presence of action items within a content segmentation unit, including but not limited to: binary indicators wherein the assignment of 1 may indicate the presence of an action item and 0 may indicate the lack of the presence of an action item (or a variation thereof); indicators comprising tags indicating content segmentation units as "full" or "empty." In some embodiments, the action item classification machine learning model may filter content segmentation units not containing action items out before generating the candidate action item subset.

For example, as depicted in FIG. 12, the content segmentation units 1201 are processed using an action item classification machine learning model 1200 to determine the action item presence detections 1203, which describe that while CSU2 and CSU 6 are associated with a negative action item presence detection, other content segmentation units are associated with an affirmative action item presence detection.

At operation 702, the document collaboration server computing device 106 determines a candidate action item subset from the content segmentation units tagged as containing action items. The content segmentation units extracted from the document data object and tagged as containing action items may be aggregated together to create a candidate action item subset. In some embodiments, as part of performing operation 702, the document collaboration server computing device 106 processes one or more content segmentation units by providing each content segmentation unit to an action item classification machine learning model to identify an action item presence prediction for each content segmentation unit. The action item classification machine learning model may attach tags to each content segmentation unit identifying the content segmentation unit as containing action items or not containing action items.

For example, as depicted in FIG. 13, the action item presence detections 1203 that were generated in accordance with FIG. 12 are provided to an action item classification filter 1300. As further depicted in FIG. 13, the action item classification filter 1300 is configured to generate a candidate action item subset 1302 of the content segmentation units that comprise the content segmentation units having an affirmative action item presence detection, i.e., the content segmentation unit CSU1, the content segmentation unit CSU3, the content segmentation unit CSU4, and the content segmentation unit CSU5.

At operation 703, the document collaboration server computing device 106 processes each content segmentation unit within the candidate action item subset using an action item extraction machine learning model to generate an action item set. The content segmentation units contained in the action item subset may be processed by an action item extraction machine learning model, wherein the action item extraction machine learning model may be trained to identify certain text and/or phrases based on the semantic meaning attached to each text and/or phrase. In some embodiments, the action item extraction machine learning model may comprise a part-of-speech tagger (POS tagger) model trained to process a string of words or phrases, such as a sentence, and attach a speech tag to each word, phrase, and punctuation. The action item set may be generated by the input of a content segmentation unit into the action item extraction model to identify a candidate action item subset and then by the input of the candidate action item subset into the action item extraction machine learning model to generate an action item set from the action items extracted from the noted corresponding content segmentation unit.

For example, as depicted in FIG. 14, the content segmentation units in the candidate action item subset 1302 that was generated in accordance with the FIG. 13 are processed using the action item extraction machine learning model 1400 to generate the following action item sets: action item set 1411 for the content segmentation unit CSU1 1101 which includes two action item detections AD1, action item set 1412 for the content segmentation unit CSU3 1103 which includes the action item detections AD2, action item set 1413 for the content segmentation unit CSU4 1104 which includes the action item detections AD3, and action item set 1414 for the content segmentation unit CSU5 1105 which includes the action item detections AD4.

In some embodiments, the POS tagger may tokenize each sentence by breaking each word and punctuation up to generate broken-up tokens and analyze the tokens individually by attaching a semantic meaning to each token. The POS tagger may include tags associated with parts of speech including but not limited to nouns, adverbs, present tense verbs, pronouns, or verbs. The POS tagger may be configured to generate Part-of-speech tag sequence to tokenize each content segmentation unit in a particular order. For instance, the part-of-speech tag sequence may parallel the order of tokens (e.g., words or punctuation) within the original semantically complete or incomplete unit of text data (e.g., if the word or punctuation is in a certain order within the sentence, then the part-of-speech tag sequence parallels that order as well). In some embodiments, the part-of-speech tag sequence may be in a different order than that of the corresponding semantically complete or incomplete unit of text data, such as a part-of-speech tag sequence that proceeds backward from the last word or punctuation in the semantically complete or incomplete unit of text data (e.g., proceeds backward from the period at the end of the sentence).

In some embodiments, a sequence processing model may incorporate the part-of-speech tag sequence to generate an accurate action item set based on the same order as the part-of-speech tag sequence. For instance, the sequence processing model may direct the action item extraction machine learning model to output tokens (e.g., words or punctuation) identified to generate an action item set in the same order as they were identified by the action item extraction machine learning model using the part-of-speech tag sequence. The sequence processing model may be generated by the order of text data within the content segmentation unit if the part-of-speech tag sequence is also generated by the same order of text data (i.e., if the part-of-speech tag sequence follows the order of the tokens within the content segmentation unit). Additionally, the sequencing processing model may be generated by any order paralleling the part-of-speech tag sequence including data left-to-right order.

An exemplary architecture for an action item extraction machine learning framework 500 is depicted in FIG. 5. As depicted in FIG. 5, a document data object 511 is processed using a content segmentation model 501 to generate a set of content segmentation units 512A-512N. Afterward, the content segmentation units 512A-512N are processed through an action item classification machine learning model 502 to generate action item presence detections 513A-513N for the content segmentation units 512A-512N. Thereafter, the action item presence detections 513A-513N are processed through the action item classification filter 503 to detect a candidate action item subset of the content segmentation units 512A-512N, which in this example only includes the content segmentation unit 512A. Then, content segmentation unit 512A is processed using the part-of-speech tagger model 504 of the action item extraction model 521 to generate the part-of-speech sequences 514A. Afterward, the sequence generator model 505 of the action item extraction model 521 processes the part-of-speech sequence 514A to generate the action item set 515. Finally, the action item set aggregator 506 aggregates the action item sets to generate the action item log 516.

At operation 403, the document collaboration server computing device 106 generates an action item log for the corresponding document data object by aggregating each action item set generated by the action item extraction machine learning model into a unit of action items corresponding to the document data object.

In some embodiments, operation 403 may be performed with respect to the content data of the document data object in accordance with the process that is depicted in FIG. 8. The process that is depicted in FIG. 8 begins at operation 801 when the document collaboration server computing device 106 identifies the action item sets produced by the action item extraction machine learning model from each content segmentation unit (of those identified as containing action items).

At operation 802, the action item log is generated by the document collaboration server computing device 106. Once the document collaboration server computing device 106 has identified the action item sets, the document collaboration server computing device 106 may generate an action item log by aggregating all the action item sets identified from a corresponding document data object. The action item log may be a representation of all action item sets generated from the corresponding web document.

At operation 404, the document collaboration server computing device 106 generates the action item log user interface data on the client-side server device which describe the content data (e.g., text data) of the action item log for the document data object. In some embodiments, the action item log user interface data comprises data (e.g., HTML data) for a single document action item log user interface element that describes all of the action items identified in the corresponding document data object. In some embodiments, the action item log user interface data comprises data for a group of document action item log user interface elements, where each document action item log user interface element comprises data (e.g., HTML data) for a section of the document data object (e.g., under first-level headings, second-level headings, paragraphs, or sentences) that is associated with the document action item log user interface element.

At operation 405, the document collaboration server computing device 106 transmits the action item log user interface data to the client computing device 102. After the action item log user interface data is transmitted to the client computing device 102, the client computing device 102 uses the action item log user interface data to generate one or more document action item log user interface elements to the end user of the client computing device 102. As described above, in some embodiments, the one or more document action item log user interface elements comprise a single document action item user interface element that describes all of the action items for a document data object. In other embodiments, the one or more document action item log user interface elements comprises a document action item user interface element for each section (e.g., first-level heading, second-level heading, paragraphs, or sentences) of the document data object that describes the action items for the corresponding section of the document data object. For instance, an action item log user interface element may be displayed directly above, directly below, or directly beside the corresponding section of the document that the action item corresponds to. Thus, there may be multiple action item log user interface elements displayed with the corresponding document data object on a client computing device 102.

Additional Implementation Details

Although example processing systems have been described in the figures herein, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an limited interaction mode and/or a non-limited interaction mode for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language page), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending pages to and receiving pages from a device that is used by the user; for example, by sending web pages to a web browser on a user's query-initiating computing device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a query-initiating computing device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a query-initiating computing device (e.g., for purposes of displaying information/data to and receiving user input from a user interacting with the query-initiating computing device). Information/data generated at the query-initiating computing device (e.g., a result of the user interaction) can be received from the query-initiating computing device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or incremental order, to achieve desirable results, unless described otherwise. In certain implementations, multitasking and parallel processing may be advantageous.

CONCLUSION

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

The invention claimed is:

1. An apparatus for generating an action item log user interface element for a webpage that displays content data associated with a document data object, the apparatus comprising at least one processor and at least one memory including program code, the at least one memory and the program code configured to, with the at least one processor, cause the apparatus to at least:

parse the content data to identify a plurality of content segmentation units, wherein the document data object is a structured document data object that is associated with a structural scheme, and wherein the plurality of content segmentation units comprise one or more predefined structural elements of the document data object that are determined based on the structural scheme;

apply an action item classification machine learning model to each content segmentation unit of the plurality of content segmentation units to determine an action item presence prediction for each content segmentation unit, wherein the action item classification machine learning model comprises a Bidirectional Encoder Representations from Transformers (BERT) model;

determine, based on each action item presence prediction for each respective content segmentation unit, a candidate action item subset of the plurality of content segmentation units;

apply an action item extraction machine learning model to the candidate action item subset to generate an action item set; and generate one or more action item log user interface elements configured for rendering to a computing device display based on the action item set.

2. The apparatus of claim 1, wherein the plurality of content segmentation units comprise one or more sentences of the document data object.

3. The apparatus of claim 1, wherein the action item extraction machine learning model comprises a BERT model.

4. The apparatus of claim 1, wherein the action item extraction machine learning model comprises a part-of-speech tagger model that is configured to generate a part-of-speech tag sequence for each content segmentation unit, and (ii) a sequence processing model that is configured to generate the action item set based on the part-of-speech tag sequence.

5. The apparatus of claim 4, wherein the sequence processing model is a BERT model.

6. The apparatus of claim 4, wherein the sequence processing model is characterized by one or more action item detection regular expression rules.

7. The apparatus of claim 1, wherein the action item classification machine learning model is trained based on a plurality of training document data objects stored to a storage subsystem, wherein each training document data object of the plurality of training document data objects is a structured document data object that is associated with a structural scheme.

8. A computer-implemented method for generating an action item log user interface element for a webpage that displays content data associated with a document data object, the computer-implemented method comprising:

parsing the content data to identify a plurality of content segmentation units, wherein the document data object is a structured document data object that is associated with a structural scheme, and wherein the plurality of content segmentation units comprise one or more predefined structural elements of the document data object that are determined based on the structural scheme;

applying an action item classification machine learning model to each content segmentation unit of the plurality of content segmentation units to determine an action item presence prediction for each content segmentation unit, wherein the action item classification machine learning model comprises a Bidirectional Encoder Representations from Transformers (BERT) model;

determining, based on each action item presence prediction for each respective content segmentation unit, a candidate action item subset of the plurality of content segmentation units;

applying an action item extraction machine learning model to the candidate action item subset to generate an action item set; and generating one or more action item log user interface elements configured for rendering to a computing device display based on the action item set.

9. The computer-implemented method of claim 8, wherein the plurality of content segmentation units comprise one or more sentences of the document data object.

10. The computer-implemented method of claim 8, wherein the action item extraction machine learning model comprises a BERT model.

11. The computer-implemented method of claim 8, wherein the action item extraction machine learning model comprises a part-of-speech tagger model that is configured to generate a part-of-speech tag sequence for each content segmentation unit, and (ii) a sequence processing model that is configured to generate the action item set based on the part-of-speech tag sequence.

12. The computer-implemented method of claim 11, wherein the sequence processing model is a BERT model.

13. The computer-implemented method of claim 11, wherein the sequence processing model is characterized by one or more action item detection regular expression rules.

14. The computer-implemented method of claim 8, wherein the action item classification machine learning model is trained based on a plurality of training document data objects stored to a storage subsystem, wherein each training document data object of the plurality of training document data objects is a structured document data object that is associated with a structural scheme.

15. A computer program product for generating action item log user interface element for a webpage that displays content data associated with a document data object, the computer program product comprising at least one non-transitory computer-readable storage medium having computer-readable program code portions stored therein, the computer-readable program code portions configured to:

parse the content data to identify a plurality of content segmentation units, wherein the document data object is a structured document data object that is associated with a structural scheme, and wherein the plurality of content segmentation units comprise one or more predefined structural elements of the document data object that are determined based on the structural scheme;

apply an action item classification machine learning model to each content segmentation unit of the plurality of content segmentation units to determine an action item presence prediction for each content segmentation unit, wherein the action item classification machine learning model comprises a Bidirectional Encoder Representations from Transformers (BERT) model;

determine, based on each action item presence prediction for each respective content segmentation unit, a candidate action item subset of the plurality of content segmentation units;

apply an action item extraction machine learning model to the candidate action item subset to generate an action item set; and generate one or more action item log user interface elements configured for rendering to a computing device display based on the action item set.

16. The computer program product of claim 15, wherein the plurality of content segmentation units comprise one or more sentences of the document data object.

17. The computer program product of claim 15, wherein the action item classification machine learning model is trained based on a plurality of training document data objects stored to a storage subsystem, wherein each training document data object of the plurality of training document data objects is a structured document data object that is associated with a structural scheme.

* * * * *